May 24, 1960
K. FENDIUS ET AL
PROCESS FOR THE PRODUCTION OF
SELF-ADHESIVE SHEETS OR TAPES
Filed Jan. 23, 1956
2,937,956
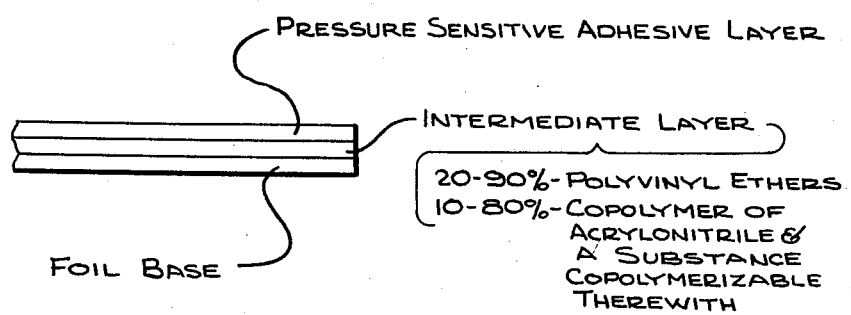
INVENTORS
KURT FENDIUS
& KURT RIECKE
BY
Stevens, Davis, Miller & Mosher
ATTORNEYS

United States Patent Office 2,937,956
Patented May 24, 1960

2,937,956

PROCESS FOR THE PRODUCTION OF SELF-ADHESIVE SHEETS OR TAPES

Kurt Fendius, Hamburg-Lokstedt, and Kurt Riecke, Hamburg-Blankenese, Germany, assignors to P. Beiersdorf & Co. A.G., Hamburg, Germany Filed Jan. 23, 1956, Ser. No. 577,436

Claims priority, application Germany Jan. 27, 1955

5 Claims. (Cl. 117—76)

This invention relates to adhesive sheets or tapes and more particularly to pressure-sensitive adhesive sheets or tapes which consist of a flexible hydrophilic or hydrophobic foil base having a smooth upper surface, an intermediate layer or primer lying on this base and a pressure-sensitive adhesive layer coated on the intermediate layer or primer.

It is an object of this invention to provide new self-adhesive tapes and sheets in which the layers are very firmly adherent to the support. It is a further object to provide new intermediate anchoring layers for such materials. A still further object is to provide new processes for the production of such intermediate layers, tapes and sheets. Further objects of the invention will hereinafter appear.

It has now been found that intermediate layers or so-called primer coatings containing mixtures of polyvinyl ethers and acrylonitrile copolymers are outstandingly suitable for producing a very firm bonding and anchoring of pressure-sensitive adhesive substances of various types, such as those containing natural or synthetic rubbers, polyisobutylene, polyvinylethers or polyacrylic acid esters, and, if desired, tackifiers (as e.g. natural or artificial resins), plasticizers, fillers, pigments or the like to both hydrophilic and hydrophobic bases.

According to the present invention, therefore, an adhesive tape or sheet comprises a flexible film or foil support of organic hydrophilic or hydrophobic material, an intermediate layer coated thereon comprising a polyvinylether and a copolymer of acrylonitrile and a substance polymerisable therewith, and a surface layer coated on said intermediate layer and comprising a pressure-sensitive adhesive.

Acrylonitrile-styrene, -butadiene, -vinylether, -acrylic acid or methacrylic acid ester copolymers are suitable as acrylonitrile-containing copolymers, and polyvinylisobutylether is an especially suitable polyvinylether. Polyvinylmethylether, polyvinylethylether, polyvinylbutylether and polyvinyldecylether may be also used. Preferably mixtures of from 10 to 80 percent of the acrylonitrile copolymer and 90–20 percent of the polyvinylether are used.

Elastomers, natural resins, artificial resins and fillers can be added in varying quantities to the mixtures to improve the anchoring effect still more.

The mixture of the components for the intermediate layer or primer can be used in the form of a solution in a suitable solvent, e.g. in toluene or trichloroethylene. It has also been found particularly advantageous to coat the components on the base in the form of an aqueous emulsion or dispersion. Fillers, artificial resin dispersions such as of polystyrene or copolymers, wetting and thickening agents can be added to adapt the emulsion to the specific requirements for coating and to improve the anchoring effect. The use of aqueous emulsions or dispersions has the advantage that, in contrast to solutions in organic solvents, the dangers of toxicity and inflammability are avoided.

Preferably, the concentration of the intermediate layer is adjusted so that after drying and evaporation of the solvent or water, about 1 to 3 g. of dry intermediate layer remains to each sq. metre of film.

The base or backing of the pressure-sensitive adhesive sheets or tapes may comprise flexible hydrophilic or hydrophobic organic materials such as regenerated cellulose, cellulose esters or ethers including cellulose acetate, cellulose acetate-butyrate, cellulose nitrate, vinyl or vinylidene halide polymers and copolymers, polyvinylchloride, polyvinylidene chloride, polystyrene, acrylonitrile copolymers, acrylic or methacrylic ester polymers or copolymers, polyesters of dibasic acids and polyvalent alcohols, polyurethanes, polyamides or plasticized materials of these types in the form of foils, film or fabrics. All of the above materials, of course, constitute natural resins, modified natural resins, or synthetic resins.

The invention is illustrated somewhat diagrammatically in the accompanying drawing, which is an enlarged side elevation, and in which is indicated a foil base carrying an intermediate layer and an adhesive layer.

The following examples will serve to illustrate the invention but are not to be regarded as limiting it in any way:

*Example I*

A mixture of the following substances is prepared for the intermediate layer:

12 parts by weight of a copolymer of 28 percent acrylonitrile with 72 percent butadiene and of deformation hardness 1000

34.5 parts by weight of polychlorobutadiene with good crystallizing properties 28 parts by weight polyvinylisobutylether (K-value=120) determined according to the Fikentscher method 10 parts by weight maleic acid resin 7 parts by weight phenolaldehyde resin to facilitate the working of the polychlorobutadiene 8.5 parts by weight highly dispersed silicic acid The substances are dissolved in trichloroethylene and mixed and the composition adjusted to a dry solids content of 3 percent by weight. A heat-treated (thermalised) polyvinylchloride film is coated with this solution and, after drying the layer thus formed, the layer is supercoated with a conventional, known pressure-sensitive adhesive substance consisting of a mixture of polyisobutylethers of various degrees of polymerisation. After evaporation of the solvent the adhesive film is cut into narrow strips and reeled, adhesive face inwards. The pressure-sensitive adhesive sticks firmly to the foil and does not separate therefrom when the strip is unwound from the roll; no residual adhesive substance remains on the surface to which the adhesive tape is temporarily applied.

In a control experiment in which the same adhesive substance is used on the same film base but no intermediate layer is provided, the adhesive substance separates from the film on removal of the adhesive strip from the roll and transfers to the back of the underlying layer.

*Example II*

A cellulose acetate film is provided with the same intermediate layer as is described in Example I and with the same adhesive substance. A very good adhesion of the adhesive substance to the base is obtained.

*Example III*

An equally good result is obtained with adhesive strips which are prepared from hydrophilic films, e.g. regenerated cellulose films, and the intermediate layer and adhesive substance described in Example I.

Example IV

An emulsion of the following composition is prepared for the intermediate layer:

| | Parts by Weight | Percent Solids |
|---|---|---|
| Latex consisting of a copolymer of 38 percent acrylonitrile and 68 percent butadiene (deformation hardness 1,000) with 31 percent dry solids content | 80 | 45.5 |
| Dispersion of polyvinylisobutylether (K-value 55, dry solids content 55 percent) | 20 | 20 |
| Highly dispersed silicic acid | 14 | 25.4 |
| Wetting agent | 5 | 9.1 |
| Water | 881 | |

Foils of heat-treated (thermalised) polyvinylchloride are coated with this emulsion and, after drying, provided with a coating of an adhesive substance having a rubber, rubber-polyisobutylene or polyvinylether basis. In each case the adhesion of the adhesive substance to the foil provided with the intermediate layer or primary is extremely good. No transfer of the adhesive substance to the back of the underlayer is found on unrolling the adhesive strip. Similarly the adhesive substance does not loosen if the adhesive strips are stuck with the sticky surfaces against one another and separated again.

Example V

An intermediate emulsion primer of the following composition is coated on to a heat-treated (thermalised) polyvinylchloride film:

| | Parts by Weight | Percent Solids |
|---|---|---|
| Latex consisting of a copolymer of 38 percent acrylonitrile with 62 percent butadiene (dry solids content 31 percent) | 35.2 | 21.8 |
| Dispersion of polyvinylisobutylether (K-value 55, dry solids content 55 percent) | 29.7 | 32.7 |
| Dispersion of polystyrene 30 percent | 60.7 | 36.4 |
| Wetting agent | 4.55 | 9.1 |
| Water | 869.85 | |

After drying, the coated film is treated with a polyvinylisobutylether adhesive substance. A very firm adhesion of the adhesive to the film is achieved.

Example VI

A heat-treated (thermalised) polyvinylchloride foil is coated with an intermediate layer consisting of an emulsion of the following composition:

| | Parts by Weight | Percent Solids |
|---|---|---|
| Latex consisting of a copolymer of 38 percent acrylonitrile with 62 percent butadiene (dry solids content 31 percent) | 52.7 | 32.7 |
| Dispersion of polyvinylisobutylether (K-value= 55, dry solids content 55 percent) | 16.55 | 18.2 |
| Dispersion of polystyrene 30 percent | 66.7 | 40.0 |
| Wetting agent | 4.55 | 9.1 |
| Water | 859.5 | |

After drying, the film carrying this intermediate layer is coated with an adhesive substance having a polyisobutylene-rubber base. The adhesive substance adheres very firmly to the film base.

Example VII

A plasticized polyvinylchloride film is coated with an emulsion of the following composition as an intermediate layer:

| | Parts by Weight | Percent Solids |
|---|---|---|
| Latex consisting of a copolymer of 38 percent acrylonitrile and 62 percent butadiene (dry solids content 31 percent) | 218 | 45.0 |
| Dispersion of polyvinylisobutylether (K-value= 55, dry solids content 55 percent) | 55.6 | 20.4 |
| Dispersion of polystyrene | 131.0 | 26.2 |
| Thickening agent (polyacrylic acid salt containing amino groups) 3.2 percent | 122.0 | 3.9 |
| Wetting agent | 6.75 | 4.5 |
| Water | 466.65 | |

A film provided with this intermediate layer and dried is coated with a conventional adhesive substance having a rubber-polyisobutylene base. A very good adhesion of the adhesive substance to the plasticized film is achieved.

Example VIII

A plasticized polyvinylchloride film is provided with an intermediate layer having the following constituents dissolved in trichloroethylene to yield a solution of 2 percent solids content:

Parts by weight
A copolymer of 28 percent acrylonitrile and 72 percent butadiene (deformation hardness 1000) ____ 35
Polyvinylisobutylether (K-value=120) _____ 22
Polyvinylisobutylether (K-value=55) _____ 13
Maleic acid resin _____ 8
Highly dispersed silicic acid _____ 10
Polystyrene _____ 12

A conventional adhesive substance having a polyvinylisobutylether base is coated on the intermediate layer. A very firm adhesion of adhesive substance to the film is achieved.

Example IX

A heat-treated polyvinylchloride film is provided with the same intermediate layer and the same adhesive substance as in Example VIII. The anchorage of the adhesive substance is extremely good.

Example X

A regenerated cellulose film is provided with the same intermediate layer and adhesive substance as in Example VIII. The layers are firmly bonded to the film.

Example XI

A regenerated cellulose film is provided with an intermediate layer consisting of an emulsion having the following composition:

| | Parts by Weight | Percent Solids |
|---|---|---|
| A latex of a copolymer of 38 percent acrylonitrile and 62 percent butadiene (dry solids content 31 percent) | 77.2 | 15.9 |
| Polyvinylchlorobutadiene latex (dry solids content 50 percent) | 16 | 5.4 |
| Polyvinylisobutylether-dispersion (K-value=55, dry solids content 55 percent) | 68 | 22.3 |
| Polyvinylmethylether solution in water (50 percent) (K=40) | 32 | 10.6 |
| Polystyrene-dispersion (30 percent) | 212 | 42.5 |
| Wetting agent | 5 | 3.3 |
| Water | 599.8 | |

After drying, the coated film is supercoated with a conventional polyvinylisobutylether adhesive substance. The adhesive adheres firmly to the film.

Example XII

A plasticized polyvinyl chloride film is provided with an intermediate layer consisting of an emulsion of the following composition:

| | Parts by Weight | Percent Solids |
|---|---|---|
| A latex of a copolymer of 38 percent acrylonitrile and 62 percent butadiene (deformation hardness 1,000) with 31 percent dry solids content | 234 | 48.3 |
| A dispersion of polyvinylisobutylether (K-value 55, dry solids content 55 percent) | 58 | 21.2 |
| Highly dispersed silicic acid | 40.5 | 27 |
| Wetting agent | 5 | 3.5 |
| Water | 662.5 | |

The intermediate layer is dried, giving a coating weight of 2 to 3 g./sq. metre of film. A polyacrylic acid adhesive is applied. The layers show very good adhesion to the film. No transfer of the adhesive to the back of the underlying layer occurred on rapid or slow unrolling of the reeled material. Similarly the adhesive is not loosened if such adhesive coated films are pressed with their adhesive surfaces together and separated again.

*Example XIII*

A dispersion of the following composition is prepared:

| | Parts by Weight | Percent Solids |
|---|---|---|
| A dispersion of polyvinylisobutylether (K-value=55, dry solids content 55 percent) | 123 | 45 |
| Aqueous solution of polyvinylmethyl ether (K-value=40, 15 percent dry solids content) | 110 | 11 |
| Dispersion of a polystyrene-acrylonitrile copolymer with an acrylonitrile content of about 28 percent and a K-value=170 (15 percent dry solids content) | 220 | 22 |
| Highly dispersed silicic acid | 19.5 | 13 |
| Wetting agent | 13.5 | 9 |
| Water | 512 | |

This mixture is coated on to a cellulose acetobutyrate film and dried to give a coating weight of 2 to 3 g./sq. metre. After drying of the intermediate layer a polyacrylic acid butyl ester adhesive is supercoated thereon. The adhesion of the layers to the film is extremely good.

*Example XIV*

A regenerated cellulose film coated with the same intermediate layer and the same adhesive substance as in Example XIII displays excellent adhesion of the layers to the film.

*Example XV*

Plasticized polyvinylchloride film and heat-treated (thermalised) polyvinyl chloride film are provided with an intermediate layer of the same composition as in Example XIII. After drying, a polyvinylisobutylether adhesive is coated on the intermediate layer. The adhesion of the layers to the films is extremely good.

*Example XVI*

A cellulose acetate film is treated as described in Example XV. A good adhesion of the layers is also obtained so that there is no transference of the adhesive to the back of the underlying layer when the coated film is reeled.

*Example XVII*

A regenerated cellulose film is treated as described in Example XV. Good adhesion of the layers to the film is achieved.

*Example XVIII*

A dispersion of the following composition is prepared:

| | Parts by Weight | Percent Solids |
|---|---|---|
| Dispersion of polyvinylisobutylether (K-value=55, dry solids content 55 percent) | 101 | 37 |
| Aqueous solution of polyvinylmethyl ether (K-value=40, 15 percent dry solids content) | 110 | 11 |
| Dispersion of a polystyrene-acrylonitrile copolymer with an acrylonitrile content of about 30 percent and a K-value=160 (15 percent dry solids) | 220 | 22 |
| Solution of dehydroabietylaminoacetate in a mixture of 70 parts water and 30 parts isopropylalcohol (50 percent dry solids) | 60 | 20 |
| Highly dispersed silicic acid | 15 | 10 |
| Water | 494 | |

The dispersion is coated on to a plasticized polyvinylchloride film. The dry intermediate layer thus formed has a coating weight of 2 to 3 g./sq. metre. Rubber-polyisobutylene and polyvinylisobutylether adhesive substances are applied to the intermediate layer. Good adhesion of the layers to the film base is achieved.

The "deformation hardness" referred to in certain of the foregoing examples is the force in grams required to compress a cylinder 10 mm. height and 10 mm. diameter to a height of 4 mm. at 80° C. in 30 seconds.

We claim:

1. An adhesive tape or sheet, comprising a flexible foil type base of organic material selected from the group consisting of hydrophobic and hydrophilic natural resins, modified natural resins, and synthetic resins, the said base having at least one smooth surface, an intermediate layer on said smooth surface consisting essentially of a mixture of 20 to 90 percent by weight of polyvinyl ethers selected from the group consisting of polyvinyl methyl ether, polyvinyl ethyl ether, polyvinyl butyl ether and polyvinyl decyl ether and mixtures thereof, and 10 to 80 percent by weight of a copolymer of acrylonitrile and a substance copolymerizable therewith selected from the group consisting of styrene, butadiene, vinyl ether, acrylic acid esters, and methacrylic acid esters and mixtures thereof, the said intermediate layer being coated with a layer of a pressure-sensitive adhesive.

2. The adhesive tape sheet of claim 1 wherein the polyvinyl ether is a polyvinyl isobutyl ether.

3. The adhesive tape sheet of claim 1 wherein the foil type base comprises a heat-treated thermalized polyvinyl chloride.

4. The method of coating a flexible foil type base of organic material selected from the group consisting of hydrophobic and hydrophilic natural resins, modified natural resins, and synthetic resins, said base having at least one smooth surface, comprising coating said smooth surface with a solution consisting essentially of, a mixture of 20 to 90 percent by weight of polyvinyl ethers selected from the group consisting of polyvinyl methyl ether, polyvinyl ethyl ether, polyvinyl butyl ether and polyvinyl decyl ether and mixtures thereof, and 10 to 80 percent by weight of a copolymer of acrylonitrile and a substance copolymerizable therewith selected from the group consisting of styrene, butadiene, vinyl ether, acrylic acid esters and methacrylic acid esters and mixtures thereof in an organic solvent therefor, drying said intermediate layer, and thereafter coating said intermediate layer with a pressure-sensitive adhesive.

5. The method according to claim 4 wherein the solvent for the intermediate layer is trichloroethylene.

References Cited in the file of this patent

UNITED STATES PATENTS

| | | |
|---|---|---|
| 2,323,831 | Menger | July 6, 1943 |
| 2,328,057 | Coulter | Aug. 31, 1943 |
| 2,348,447 | Bock | May 9, 1944 |
| 2,415,901 | Nelson | Feb. 18, 1947 |
| 2,556,885 | Ness | June 12, 1951 |
| 2,592,550 | Engel | Apr. 15, 1952 |
| 2,646,371 | McGarry | July 21, 1953 |
| 2,647,843 | Bemmels | Aug. 4, 1953 |
| 2,688,008 | Chaney | Aug. 31, 1954 |
| 2,689,197 | Gerlich | Sept. 14, 1954 |